(12) United States Patent
Wang et al.

(10) Patent No.: US 8,398,234 B2
(45) Date of Patent: Mar. 19, 2013

(54) ELECTRO-THERMAL ANTIFOG OPTICAL DEVICES

(75) Inventors: Pingshan Wang, Hudson, OH (US); Brij P. Singh, North Royalton, OH (US); Aladin B. Ferian, III, Berea, OH (US); Timothy H. Morgan, Solon, OH (US); Debra N. Welchel, Woodstock, GA (US); Matrice B. Jackson, Woodstock, GA (US)

(73) Assignee: Kimberly-Clark Worldwide, inc., Neenah, WI (US)

( * ) Notice: Subject to any disclaimer, the term of this patent is extended or adjusted under 35 U.S.C. 154(b) by 171 days.

(21) Appl. No.: 13/099,576

(22) Filed: May 3, 2011

(65) Prior Publication Data

US 2012/0281179 A1 Nov. 8, 2012

(51) Int. Cl.
*G02C 11/08* (2006.01)

(52) U.S. Cl. .............. 351/62; 351/158; 2/435; 359/512; 977/748

(58) Field of Classification Search .................... 351/41, 351/62, 158; 2/435–437; 252/512, 513; 359/507, 512; 977/742, 748, 832, 834, 950
See application file for complete search history.

(56) References Cited

U.S. PATENT DOCUMENTS

| 4,209,234 A * | 6/1980 | McCooeye .................... 351/62 |
| 4,500,567 A | 2/1985 | Kato et al. |
| 4,584,721 A | 4/1986 | Yamamoto |
| 4,682,007 A | 7/1987 | Hollander |
| 4,767,671 A | 8/1988 | Parker et al. |
| 4,868,929 A | 9/1989 | Curcio |
| 4,910,645 A | 3/1990 | Jonas et al. |
| 4,942,629 A | 7/1990 | Stadlmann |
| 4,957,358 A | 9/1990 | Terada et al. |
| 4,991,951 A | 2/1991 | Mizuno et al. |
| 5,035,926 A | 7/1991 | Jonas et al. |
| 5,319,397 A | 6/1994 | Ryden |
| 5,459,533 A | 10/1995 | McCooeye et al. |
| 5,471,036 A | 11/1995 | Sperbeck |
| 5,668,618 A | 9/1997 | Simioni |

(Continued)

FOREIGN PATENT DOCUMENTS

| DE | 3323670 A1 | 1/1985 |
| EP | 0339340 A2 | 11/1989 |

(Continued)

OTHER PUBLICATIONS

Abstract of Article—Ksapabutr et al., "Improvement of electrical property in MWCNTs/PEDOT-pss nanocomposite films via microwave treatment," *Nanoelectronics Conference, 2008, INEC 2008, 2nd IEEE International*, Mar. 24-17, 2008, pp. 144-149.

(Continued)

*Primary Examiner* — Huy K Mai
(74) *Attorney, Agent, or Firm* — Dority & Manning, P.A.

(57) ABSTRACT

Devices including a coating layer formed of a transparent, conductive coating composition described. The coating layer may function as an active antifog coating for the prevention of water vapor condensation as droplets on a surface. The coating includes a conductive polymer and functionalized carbon nanostructures and may be crosslinked with a transition metal crosslinking agent. The composition may be coated on a surface used in a visualization application such as a face shield, glasses, safety glasses, goggles, oculars, etc., to prevent fogging on the surface.

18 Claims, 2 Drawing Sheets

U.S. PATENT DOCUMENTS

| | | |
|---|---|---|
| 5,795,501 A | 8/1998 | Kano |
| 5,845,342 A | 12/1998 | Park |
| 5,972,485 A | 10/1999 | Sanada |
| 5,980,037 A | 11/1999 | Conway |
| 6,213,125 B1 | 4/2001 | Reese et al. |
| 6,355,187 B1 | 3/2002 | Sanada et al. |
| 6,470,696 B1 | 10/2002 | Palfy et al. |
| 6,834,509 B2 | 12/2004 | Palfy et al. |
| 6,886,351 B2 | 5/2005 | Palfy et al. |
| 6,927,298 B2 | 8/2005 | Groenendaal et al. |
| 7,157,023 B2 | 1/2007 | Mears |
| 7,238,415 B2 | 7/2007 | Rodriguez et al. |
| 7,290,545 B2 | 11/2007 | Kleman et al. |
| 7,393,472 B2 | 7/2008 | Lee et al. |
| 7,473,153 B2 | 1/2009 | Kang et al. |
| 7,488,769 B2 | 2/2009 | Bremser et al. |
| 7,495,251 B2 | 2/2009 | Zhu et al. |
| 7,586,663 B1 | 9/2009 | Radmard et al. |
| 7,648,234 B2 | 1/2010 | Welchel et al. |
| 7,703,456 B2 | 4/2010 | Yahiaoui et al. |
| 7,725,948 B2 | 6/2010 | Steindorf |
| 7,922,324 B2 | 4/2011 | Ishibashi et al. |
| 2004/0135126 A1 | 7/2004 | Schwark et al. |
| 2004/0152832 A1 | 8/2004 | Kirchmeyer et al. |
| 2005/0209392 A1 | 9/2005 | Luo et al. |
| 2007/0120095 A1 | 5/2007 | Gruner |
| 2007/0246689 A1 | 10/2007 | Ge et al. |
| 2011/0069274 A1* | 3/2011 | Han et al. .................. 351/62 |

FOREIGN PATENT DOCUMENTS

| | | |
|---|---|---|
| EP | 0339340 A3 | 11/1989 |
| EP | 0785464 A1 | 7/1997 |
| EP | 0796403 B1 | 9/1997 |
| EP | 0974558 A2 | 1/2000 |
| EP | 0974558 A3 | 1/2000 |
| EP | 1275624 A1 | 1/2003 |
| JP | 11167001 A | 6/1999 |
| WO | WO 2007061428 A2 | 5/2007 |
| WO | WO 2007061428 A3 | 5/2007 |
| WO | WO 2008039228 A1 | 4/2008 |

OTHER PUBLICATIONS

ASTM D1003-07$^{e1}$—Standard Test Method for Haze and Luminous Transmittance of Transparent Plastics, Current Edition approved Nov. 1, 2007, 7 pages.

* cited by examiner

ELECTRO-THERMAL ANTIFOG OPTICAL DEVICES

BACKGROUND

A continuing problem attendant with the use of optical glasses, goggles, face shields, and other optical devices in both medical and industrial applications is fogging of the viewing substrate. The warm, moist air exhaled by the wearer will condense on relatively cool surfaces that are in close proximity to the nose or mouth of the user. Condensate droplets will fog the viewing surfaces, which may seriously impair vision.

Various approaches have been attempted to alleviate the problems due to fogging on goggles and glasses. For example, passive coatings for surfaces have been described that function by absorbing moisture and/or spreading the moisture across a surface to eliminate droplet formation that leads to fogging. Examples of passive coatings have been described in U.S. Pat. Nos. 4,767,671 and 5,668,618. More recently, active approaches have been suggested for use in preventing condensate that leads to misting or fogging of a surface. For example, U.S. Pat. No. 6,470,696 describes a device including two thermal sensors, one in contact with a surface and the other in contact with a cooling device. The device also includes a humidity sensor. A circuit causes a condensation removal mechanism to be activated for removing liquid from the surface when the humidity sensor indicates the presence of condensation based upon the readings of the thermal sensors. In another example, German publication DE 3323670 describes a visor that includes a strip of conductive material attached to the visor and terminals for electrical connection to a current source to heat the visor via the strip and prevent misting of the visor.

While the above describe improvement in the art, room for additional improvement exists. What are needed in the art are active coatings for prevention of condensation, for example, fog, on surfaces.

SUMMARY

According to one embodiment, disclosed is an optical device including a transparent lens, a conductive transparent layer on a surface of the transparent lens, and a power supply. The conductive transparent layer includes a crosslinked network including a polythiophene, thiophene functionalized carbon based nanostructures, and a transition metal crosslinking agent. In addition, the power source is in electrical communication with the conductive transparent layer.

Also disclosed is a substrate defining a first surface and comprising a conductive transparent layer on the first surface, the conductive transparent layer comprising a crosslinked network including poly(3,4-ethylene-dioxythiophene) (PEDOT), polystyrene sulfonic acid (PSS), thiophene derivatized carbon nanotubes, and a transition metal crosslinking agent.

BRIEF DESCRIPTION OF THE DRAWINGS

A full and enabling disclosure of the subject matter, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Figure 1:
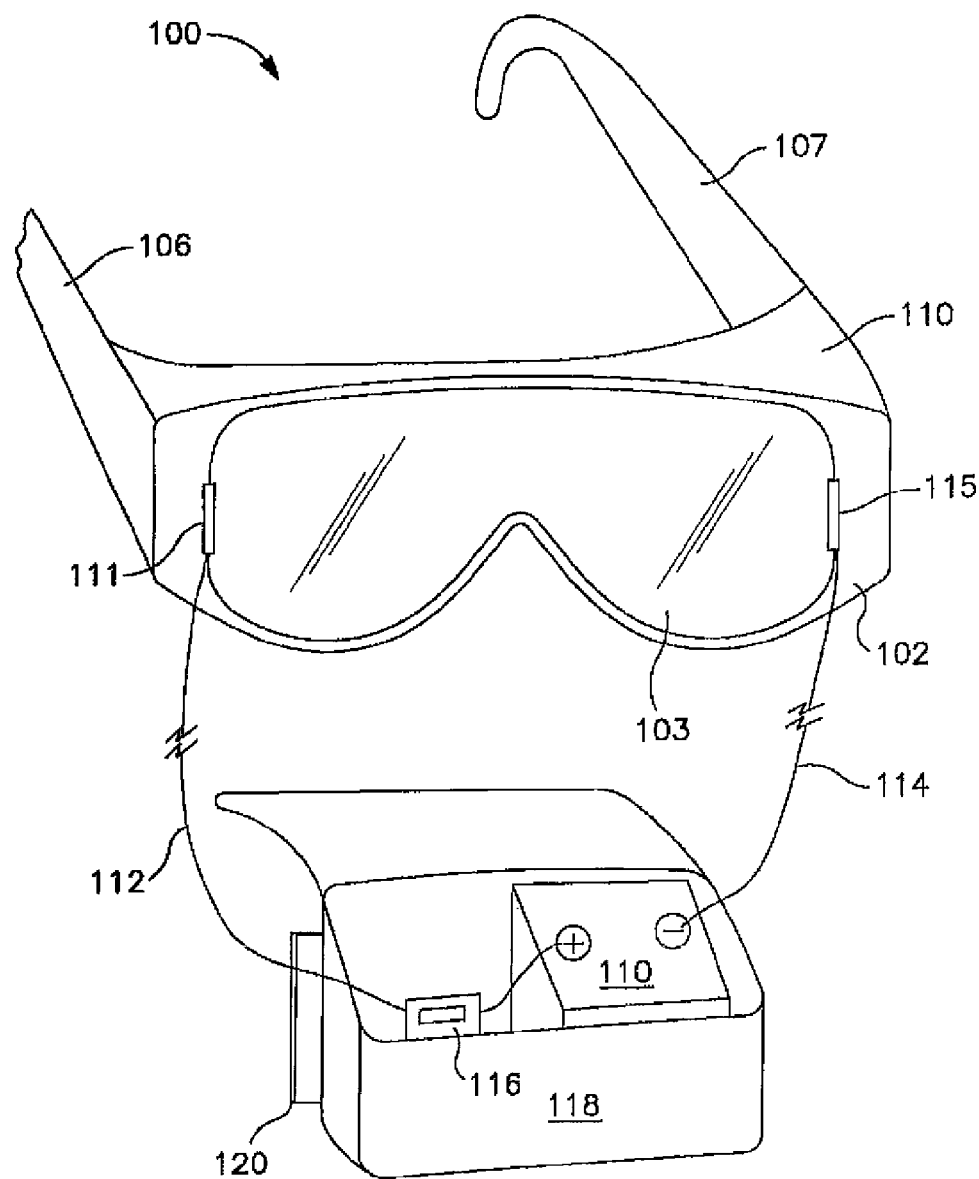
FIG. 1 is a schematic illustration of a pair of goggles including a coating as described herein.

Reference now will be made in detail to various embodiments of the disclosed subject matter, one or more examples of which are set forth below. Each example is provided by way of explanation, not limitation. In fact, it will be apparent to those skilled in the art that various modifications and variations may be made in the present disclosure without departing from the scope or spirit of the subject matter. For instance, features illustrated or described as part of one embodiment may be used on another embodiment to yield a still further embodiment. Thus, it is intended that the present disclosure covers such modifications and variations as come within the scope of the appended claims and their equivalents.

The present invention is directed to optical devices including an active layer on a surface for the prevention of fogging of the surface. The layer is formed from a composition that includes a conductive polymer and functionalized carbon based nanostructures. The functionalized carbon based nanostructures may improve the electrical characteristics of the layer beyond what is capable of the conductive polymer alone. To provide further improvement, the composition includes a transition metal crosslinking agent that may form a complex with both the conductive polymer and the functionalized carbon based nanostructures. The layer formed of the composition is crosslinked with the transition metal compound. Accordingly, the crosslinked matrix includes the conductive polymer, the carbon based nanostructures, and the transition metal crosslinking agent, all of which may be in electrical communication with one another. As the carbon based nanostructures are complexed within the crosslinked network, and not merely blended with the polymer of the layer, improved electrical contact may be obtained. This may provide a layer with excellent electrical characteristics at low add-on levels of the carbon based nanostructures. In one embodiment, scratch resistant hard coat solution materials may be combined with the other components of the composition to improve the mar and abrasion resistance of the layer without adversely affecting the electrical characteristics of the layer.

The crosslinked layer may be placed in electrical communication with a power source to complete a circuit. Current flow through the circuit may lead to an increase in the temperature of the surface, which may prevent fogging of the surface. Hence, a transparent substrate including the layer on a surface may be beneficially utilized in optical devices such as goggles, optical glasses, safety glasses, welding lenses (both fixed and variable shades), visors, face shields, and so forth.

As utilized herein, the term 'fogging' refers to condensate on a surface such that visualization through the surface is impaired, as in a transparent lens, or such that the ability to visualize the surface itself is impaired. The condensate droplets cause the scattering of incident light and decrease in visualization, or fogging.

The composition includes one or more conductive polymers suitable for use in forming a translucent or transparent layer. As utilized herein, the term 'translucent' refers to a material having a transmission of light in the visible spectrum (between about between about 300 nanometers and about 800 nanometers) of between about 30% and about 85%. As utilized herein, the term 'transparent' refers to material having a light transmission in the visible spectrum greater than about 85%. In one embodiment, a transparent film may have a light transmission of greater than about 90%, or greater than about 95%. A coated substrate may have a percent haze of less than about 5%, or less than about 3%. Haze is defined as the percentage of transmitted light, which, in passing through the specimen, deviates from the incident beam by more than an average of 25 degrees. Haze is commonly referred to as the "milkiness" of a specimen, or its loss in contrast. Translucency, transparency, and haze may be measured by a comparison of the intensity of the incident light to that of the light passing through the material according to standard protocols. For instance, by use of testing methods described in ASTM D1003-07e1 entitled "Haze and Luminous Transmittance of Transparent Plastics," (DOI: 10.1520/D1003-07).

In general, the composition used to form the conductive layer may be aqueous, though small amounts of solvents may be present in the composition, as is known. For instance, small amounts of solvents, for instance less than about 5% by weight of the composition, may be included such as alcohols, benzene, pyrrolidone, formyl amines, glycol ethers, and so forth. The composition may contain, for instance, at least about 75 wt. % water, in some embodiments at least about 90 wt. % water, and in some embodiments, at least about 96 wt. % water.

The conductive, transparent polymer of the coating composition may be a polythiophene, which encompasses polythiophene as well as any derivative thereof. In general, a coating composition can include less than about 3% by weight of a polythiophene, or less than about 1% by weight in another embodiment. For instance, the composition can include between about 0.01% by weight and about 1% by weight of a polythiophene. A polythiophene may have a structure of:

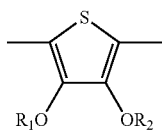

wherein $R_1$ and $R_2$ are independently selected from hydrogen, or a $C_1$-$C_4$ alkyl group or $R_1$ and $R_2$ together form an optionally substituted $C_1$-$C_4$ alkylene radical, for instance a methylene radical that is optionally substituted with alkyl groups, a 1,2-ethylene radical that is optionally substituted with $C_1$-$C_{12}$-alkyl or phenyl groups, or a 1,2-cyclohexylene radical.

In one preferred embodiment, the composition may include the polythiophene derivative poly(3,4-ethylenedioxythiophene) having the structure:

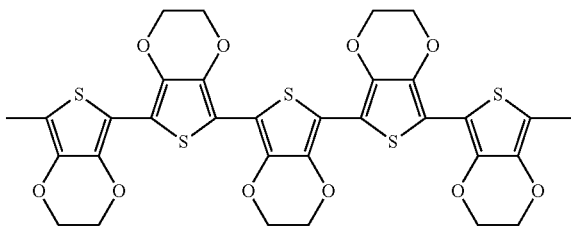

Any suitable method may be utilized for forming a polythiophene. For example, poly(3,4-ethylenedioxythiophene) may be formed via the oxidation of a 3,4-ethylenediox-ythiophene monomer leading to withdrawal of an electron from the 3,4-ethylenedioxythiophene heteroaromatic ring. Oxidants may include, without limitation, iron (III) salts, such as $FeCl_3$, $Fe(ClO_4)$ and the iron (III) salts of organic acids and of inorganic acids containing organic radicals. Other suitable oxidants may include $H_2O_2$, $K_2Cr_2O_7$, alkali metal persulphates, ammonium persulphates, alkali metal perborates and potassium permanganate. The combination of two oxidized monomers will form a dimer with release of a proton. Further oxidation of dimers will lead to formation of trimers, etc., until long poly(3,4-ethylenedioxythiophene) chains are formed. The ionization potential of 3,4-ethylenedioxythiophene monomers and poly(3,4-ethylenedioxythiophene) dimers, trimers, and infinitely long chains are 1.1, 0.46, 0.16 and −0.25V (vs. Ag/Ag+), respectively. Consequently, once oligomers are formed, polymerization may accelerate rapidly.

It should be understood that the compositions are not limited to poly(3,4-ethylenedioxythiophene), and other polythiophenes as well as blends of two or more polythiophenes are encompassed herein including, without limitation, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

As polythiophenes tend to be insoluble, the composition may include a secondary component that may improve the solubility of the polymer. For example, a composition may include poly(3,4-ethylenedioxythiophene) in conjunction with the water soluble cationic polyelectrolyte polystyrene sulfonic acid having the structure:

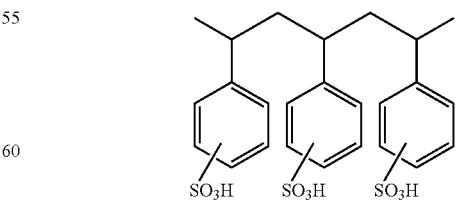

Poly(3,4-ethylenedioxythiophene)/polystyrene sulfonic acid compositions may be formed according to known methodology (for example, using the polyelectrolyte polystyrene sulfonic acid as the charge-balancing dopant during the poly (3,4-ethylenedioxythiophene) polymerization process), or alternatively may be obtained commercially. For example, prepared PSS/PEDOT mixture may be purchased from Aldrich or other companies with a solids content of about 1.3-2.6%. In such a case, the solution may be adjusted as needed or may alternately be directly used in formulation. Poly(3,4-ethylenedioxythiophene)/polyelectrolyte polystyrene sulfonic acid available under the Clevios™ brand is also available from Heraeus of Hanau, Germany. In general, the ratio of poly(3,4-ethylenedioxythiophene) to polyelectrolyte polystyrene sulfonic acid may be between about 1 and about 2.5 by weight, though this is not a requirement of a composition, and any suitable ratio of the two is encompassed herein.

Any other method for solubilizing a polythiophene may be utilized in forming a composition. For instance, in one embodiment poly(3,4-ethylenedioxythiophene)-tetramethyl acrylate may be utilized. poly(3,4-ethylenedioxythiophene)-tetramethyl acrylate is an ABA block copolymer that includes branched end-capping tetramethyl acrylate groups that promote dispersibility.

The total amount of polymer in a composition, for instance the total amount of polythiophene and polymeric solubilizer can be between about 1.5% and about 3% by weight of the composition.

In addition to the conducting polymer and any stabilizer, the composition includes carbon based nanostructures. An amount of conductive and/or semiconductive carbon based nanostructures may be included in the formed matrix so as to enhance the electrical characteristics of the layer formed from the composition without sacrificing the transparency of the coating.

The carbon based nanostructures may include any structure that has at least one dimension on a nanometer scale. In particular, while the nanostructures may, in certain embodiments, describe very high aspect ratios, for instance greater than 1000 nanometers, and may include a length dimension that is on a larger scale, they will define at least one dimension on a nanometer scale, for example, less than about 500 nanometers. The nanostructures may define any overall shape. For example, the nanostructures may be hollow or solid, may be spherical, fibrillar, or relatively flat, such as a flat platelet shape, for example, graphite or graphene nanostructures. In addition, the composition may incorporate a plurality of substantially identical nanostructures or optionally may incorporate a mixture of different nanostructures, including a combination of nanostructure formed of different shapes, formed to different lengths, or any combination thereof.

In one embodiment, the carbon based nanostructures may be carbon nanotubes or carbon nanospheres (for example, buckyballs, nanoonions, or other fullerenes). Carbon nanotubes may be single-walled carbon nanotubes, multi-walled carbon nanotubes, or a mixture of different carbon nanotubes. For example, the nanostructures may include isolated single-walled carbon nanotubes and/or single-walled carbon nanotubes bundles. In general, a single-walled carbon nanotubes bundle may have an outer diameter between about 5 nanometers and about 200 nanometers, while an individual single-walled carbon nanotube may have an outer diameter of less than about 5 nanometers. In general, individual multi-walled carbon nanotubes may have an outer diameter between about 5 nanometers and about 100 nanometers.

The carbon based nanostructures may be formed according to any known method or procedure. For instance, carbon nanotubes may be formed according to an electric arc method, a laser-vaporization method, a HiPco method, a chemical vapor deposition method, or any other method as is known in the art. Carbon nanotubes may be formed according to any known methodology or may be obtained on the commercial market. For example, multi-walled carbon nanotubes, single-walled carbon nanotubes, or double walled nanotubes are available from NanoLab, Inc. of Waltham, Mass.; Nano-C, Inc. of Westwood, Mass.; or Unidym of Sunnyvale, Calif.

Depending upon the formation technique, the carbon-based nanostructures may be mixed with an amount of impurities such as soot, catalysts, nucleators, and so forth upon formation. The carbon based nanostructures may be purified following formation and prior to addition to the coating composition. For instance, the carbon based nanostructures may be provided to the composition at greater than about 90% purity.

In one embodiment, an as-formed carbon based nanostructure composition may be purified by subjection to heating in an oxidizing atmosphere, treatment with a strong acid, often while being subjected to sonication, followed by a final wash. However, it should be understood that any purification process as is known in the art may optionally be utilized.

The carbon based nanostructures may be functionalized to facilitate distribution of the nanostructures throughout the composition as well as to facilitate crosslinking of the polymeric matrix during formation of the coating layer. More specifically, the carbon based nanostructures may be functionalized with a thiophene derivative to encourage distribution of the nanostructures throughout the polythiophene-based coating composition.

The preferred thiophene derivative for coupling with the carbon based nanostructures may vary, depending upon the functionalization scheme to be utilized. For instance, in one embodiment, the carbon based nanostructures may be activated through oxidation of the structures to introduce carboxylic acid groups on the structures, and an amine derivative of thiophene may be coupled to the nanostructures through formation of an amide bond. In one preferred embodiment, the carbon based nanostructures may be functionalized through coupling with 2-aminothiophene via amide bond formation.

Other coupling reactions may alternatively be utilized, primarily depending upon the initial activation groups of the nanostructures and the corresponding thiophene derivative. For instance, carbon nanotubes may be activated through reaction of the carbon nanotubes with fluorine gas to provide fluorine derivatized nanotubes and then further derivatized via nucleophilic substitution with a desired nucleophile, for example, an alkyl lithium species, substituted hydrazines, or alkyl amines. The activated carbon nanostructures may then be reacted with an appropriate derivative of thiophene according to known chemistries to form the thiophene functionalized nanostructures.

The composition may include an amount of thiophene functionalized carbon based nanostructures so as to enhance conductivity of a layer formed of the composition without sacrificing the transparency of the layer. For example, a coating composition may include less than about 5% by weight of the carbon based nanostructures, less than about 3% by weight or less than about 1% by weight.

The thiophene functionalized carbon based nanostructures may be readily dispersed throughout an aqueous poly(3,4-ethylenedioxythiophene) solution. In one embodiment, dispersion may be enhanced by sonication that can be applied for a period of time of between about 5 minutes up to several hours. The various components may be combined in different ways, and the method of forming the composition is not critical. For instance, the thiophene functionalized nanostructures may be combined with a formed poly(3,4-ethylenedioxythiophene)/polyelectrolyte polystyrene sulfonic acid dispersion, or alternatively, the thiophene functionalized nanostructures may first be combined with a polyelectrolyte polystyrene sulfonic acid solution via, for example, mixing in conjunction with sonication, and this solution may then be combined with a poly(3,4-ethylenedioxythiophene) dispersion.

The composition also includes a crosslinking agent that may crosslink the polymer/nanostructure matrix following application to a surface. The crosslinking agents may include transition metal ions and/or transition metal salts. While not wishing to be bound to any particular theory, it is believed that a transition metal crosslinking agent will complex with the sulfur atom of the thiophene groups of both the poly(3,4-ethylenedioxythiophene) and the functionalized carbon based nanostructures, forming a coating including a conductive crosslinked matrix including both polymeric components and the nanostructures.

Transition metals encompassed herein include any element in the d-block of the periodic table, i.e., any element in groups 3 through 12 of the periodic table. In another embodiment, transition metals encompassed herein include those elements having an incomplete d sub-shell, which would encompass any element in groups 3 through 11 of the periodic table. In one embodiment, transition metals for use as a crosslinking agent may include manganese, iron, cobalt, nickel, copper, silver, gold, platinum, palladium, vanadium and chromium. For example, the transition metal may be iron, copper, silver, gold, cobalt or nickel. In general, the transition metal crosslinking agent may be a transition metal ion or a transition metal salt of the formula $MX_n$, wherein M is a transition metal, X is a halogen negative ion, sulfur atom or a conjugate base negative ion of an acid, and n is an integral number of 1 to 6. Examples of suitable crosslinking agents include, without limitation, halide, chloride, sulfate, acetate, ammonium, or nitrate salts of transition metals such as ferric chloride, ferric sulfate, ferric nitrate, cupric chloride, as well as combinations of transition metal compounds.

The transition metal crosslinking agent may be dissolved or dispersed into the composition. In the case of a transition metal powder dispersed in the composition, a particle size of the metal powder may be below about 10 micrometers (μm). If desired, a surface of the metal powder may be oxidized with a diluted weak acid such as acetic acid. The composition may include the transition metal crosslinking agent in a concentration of between about 0.1 wt. and about 2.0 wt. % of the coating composition. For instance, the metal ion concentration in the composition can be between about 0.1M and about 0.001M.

The composition may include additional constituents, as desired. For example, in those embodiments in which the composition will form an antifog coating on a visualization surface such as a pair of goggles, the composition may include one or more additional materials that may impart scratch and/or chemical resistance, anti-reflective characteristics, and so forth. For instance, a coating composition may include an amount of a hydroxylated fluoropolymer or a siloxane based resin and a crosslinking agent therefore as is known in the art, which may provide scratch and weather resistance to the coating. For example, the composition may include between about 5 wt. % and about 20 wt. % of a scratch resistant hard coat resin such as a siloxane polymer resin, an acrylic polymer resin, or a hydroxylated polymer comprising fluorine-containing monomer units such as tetrafluoroethylene or chlorotrifluoroethylene, and optionally including fluorine-free, ethylenically unsaturated monomer units. A fluoropolymer may include more than about 20% by weight of fluorine. The composition may also include a crosslinking agent for the hydroxylated fluoropolymer such as, for example, methylamine and/or polysilicic acid.

The composition may also include one or more binders that may improve the adhesion of the crosslinked matrix to a substrate. Examples of useful binders include, without limitation, polyvinyl acetate, polycarbonate, polyvinyl butyrate, polyacrylates, polymethacrylates, polystyrene, polysulfonated styrene, polyacrylonitrile, polyvinyl chloride, polybutadiene, poly-isoprene, polyethers, polyesters, silicones, pyrrole/acrylate, vinyl acetate/acrylate, ethylene/vinyl acetate copolymers, polyvinyl alcohols, and any derivatives or mixtures thereof. Binders may be included in a composition in relatively small amounts, for instance less than about 10% by weight of the composition.

Following formation, the composition may be coated onto a substrate. The composition may be used immediately upon formation, or alternatively may be stored for a period of time, for instance for several days, prior to use. A layer formed by the composition may completely cover a surface of a substrate or may partially cover a surface. For instance, a layer may be applied to a surface in a pattern. A pattern will be a continuous pattern, such that a current can flow through the formed layer, but need not completely cover a substrate surface.

The substrate may be organic or inorganic, flexible or rigid, and of any suitable size and shape. For instance, a substrate may be polymeric or ceramic. In one preferred embodiment, the substrate may be a transparent material for use in an optical application such as lenses for glasses, goggles or other oculars, face shields or visors for helmets or face masks, and so forth. In one embodiment, a substrate may be a glass, for instance an optical-grade glass such as a borosilicate glass or a fluorite glass. In another embodiment, a substrate may be a polymeric material for use in an optical application including thermoplastic materials such as polycarbonates, polyesters such as polyethylene terephthalate or polybutylene terephthalate, polystyrenes, polysulfones, polyethersulfones, cellulose acetate butyrate and thermoplastic polyurethanes; or thermoset materials such as diethyleneglycol bis allylcarbonate polymers and copolymers, thermoset polyurethanes, polythiourethanes, polyepoxides, polyepisulfides, polyacrylates including poly(meth)acrylates such as polymethylmethacrylate, polythio(meth)acrylates, as well as copolymers and blends thereof.

A substrate may be in the form of a single or multilayered film, sheet, panel or pane of material, and may be formed by any well-known process, such as blowing, casting, extrusion, injection molding, and so forth. In one embodiment, the composition may be coated between two layers of a multilayer substrate. For instance, a layer may be formed between glass or polymer substrates.

The composition may be coated onto one or more surfaces of the substrate according to any suitable coating method or combinations of methods including, without limitation, dip coating, spin coating, spray coating, printing (for example, rotogravure), bar coating, solution coating, blade coating, slot-die coating, and so forth. In one embodiment, the composition may be coated on a single surface of a substrate, for example, an inner surface of a face shield. In other embodiments, however, the composition may be coated on both an inner and outer surface of a substrate or may envelope an entire substrate.

To ensure uniform coating and/or wetting of the substrate, the substrate may be oxidized prior to coating using, for example, corona discharge, ozone, plasma, or flame treatment methods. In some embodiments, a substrate may also be applied with a pretreatment to facilitate uniform application of the coating composition thereto. For instance, a primer such as polyvinylidene chloride or polyvinyl chloride may be applied to a transparent substrate. Typically, the primer does not have a substantial affect on the optical properties of the transparent substrate.

The average thickness of the resulting coating can be less than about 5 microns in thickness, or less than about 2 microns, in one embodiment. For example, the average thickness of the layer can be between about 0.8 and about 1.2 microns.

According to one embodiment, the average thickness of the resulting coating may be selected to minimize glare. Specifically, a single-layer optical coating having a thickness equal to ¼ the wavelength of incident light will result in reflections from the air-coating boundary and coating-substrate boundary that are 180° out of phase with each other, thereby causing destructive interference and reducing total reflectance. Thus, in those embodiments in which the wavelength of incident light may range from about 200 nanometers to about 1000 nanometers, the average thickness of the coating may range from about 50 nanometers to about 250 nanometers. In addition, because 550 nanometers is the wavelength at which the human eye displays a peak photo-optic response, the average coating thickness may be about 140 nanometers in one embodiment. It should be understood, however, that the coating is not limited to a single layer, but may also contain multiple layers. For example, it is readily understood by those skilled in the art that two layers may be utilized, with each layer being optimized in thickness to minimize reflection of different wavelengths of light, thus providing anti-glare properties over a wide spectrum of light. In addition, while the average coating thickness may be uniform, the actual coating thickness may vary considerably from one particular point on the coating to another. Such variations in thickness, when correlated over a visibly distinct region, may be beneficial by contributing to broadband anti-reflective properties of the coating.

The coating may be dried and cured in air and optionally with the addition of energy to increase the cure rate. For example, the coated substrate may be cured in an oven at a temperature of from about 20° C. to about 150° C., in some embodiments from about 50° C. to about 130° C., and in some embodiments, from about 100° C. to about 120° C. Alternative cure methods as are known may be utilized, such as by subjecting the coated surface to irradiation, for example, microwave irradiation. Once dried and cured, the conductive polymer component of the layer may constitute at least about 50 wt. %, in some embodiments at least about 75 wt. %, and in some embodiments, at least about 90 wt. % of the cured layer.

The sheet resistance ($R_S$) of a layer is a function of the bulk resistivity of the layer and the layer thickness. It is a measure of electrical resistance in a thin film that is nominally uniform in thickness and capable of approximation as a two dimensional system. Sheet resistance may be described in units of ohms or optionally as ohms per square (Ohms/sq.), where "square" is dimensionless. Ohms per square is exclusively utilized when describing sheet resistance, and thus may be used to differentiate the two dimensional resistance from a three dimensional system. Sheet resistance may be measured using a four-point probe, in which a direct current is applied between two outer current electrodes and a voltage is measured between two inner electrodes located within the two outer electrodes, with the current flowing along the plane of the film. Four-point probes utilize a geometric correction factor based on the orientation and spacing of the electrodes in the probe to correct the voltage/current ratio measured by the probe. The resistivity of the film may be calculated from the sheet resistance by multiplying the sheet resistance by the thickness of the film. In one embodiment, a cured film formed of the conductive polymer composition may have a sheet resistance of between about 300 Ohms/square and about 900 Ohms/square, for instance between about 330 Ohms/square and about 890 Ohms/square. In another embodiment, the sheet resistance may be less than about 300 Ohms/square, less than about 175 Ohms/square, less than about 150 Ohms/square, or less than about 100 Ohms/square.

The conductivity ($\sigma$) of a coating is the measure of the electrical conduction of the material. Conductivity may be measured by applying a differential electric field across the layer and monitoring the electrical current that results. The conductivity is then calculated by dividing the current density by the strength of the applied electric field. Conductivity is the reciprocal of electrical resistivity, thus conductivity may be calculated from sheet resistance by taking the reciprocal of the sheet resistance multiplied by the film thickness ($\sigma=1/(R_S \times t)$). A film as described herein may have a conductivity of greater than about 100 siemens per centimeter, greater than about 450 siemens per centimeter, greater than about 600 siemens per centimeter, or greater than about 750 siemens per centimeter. In one preferred embodiment, a film may have a conductivity greater than about 400 siemens per centimeter, for instance between about 185 and about 485 siemens per centimeter, in one embodiment.

Optionally, additional layers may be formed on the substrate, either beneath the conductive layer, above the conductive layer, or at a different location on the substrate as the conductive layer. For instance, an anti-reflective coating and/or a scratch resistant coating may be formed on top of the conductive layer or may be formed on the opposite side of a substrate.

In one embodiment, a scratch resistant coating may be formed on top of the conductive layer. Alternatively, the components of the conductive layer and the scratch resistant coating can be combined together to form a single coating composition. For instance, following cure of the conductive layer and any necessary connection formation for electrical communication to a power source (for example, electrode formation), a scratch resistant and/or chemical resistant coating may be formed on the conductive layer. A scratch resistant coating may include a crosslinked hydroxylated fluoropolymer formed in a separate layer, or any other scratch resistant coating as is known in the art.

In one embodiment, a siloxane-based hard coat may be formed on the substrate. For example, a siloxane-based coating may be prepared by adding polymerizable components such as tetraalkyl orthosilicate, epoxyalkylalkoxy silanes, and (meth)acryloxyalkylalkoxy silanes in a solvent mixture containing an acid catalyst and other additives as are known in the art. The polymerizable components can generally be included in the solvent mixture in an amount of between about 15% and about 55% by weight. For instance, the polymerizable mixture may contain between about 40% and about 60% by weight of tetraalkyl orthosilicates, between about 15% and about 45% by weight of epoxyalkylalkoxy silanes and between about 5% and about 15% by weight of (meth)acryloxyalkylalkoxy silanes. The total solvent mixture may contain between about 20% and about 60% by weight water, between about 10% and about 25% by weight of a solvent mixture, between about 0.05% and about 0.5% by weight of 2M HCl and between about 0.4% and about 2.5% by weight of acetic acid together with between about 0.1% and about 1.2% by weight of wetting agents and between about 0.1% and about 0.5% by weight of other catalysts or curing agents as are known in the art.

Examples of tetraalkyl orthosilicate include but are not limited to tetramethyl orthosilicate, tetraethyl orthosilicate, tetrapropyl orthosilicate, and tetrabutyl orthosilicate.

Examples of epoxysilanes used in the invention include but are not limited to 1-glycidoxyethyltrimethoxysilane, 2-glycidoxypropyltriethoxysilane, 3-glycidoxypropyltrimethoxysilane, 3-glycidoxypropyltriethoxysilane, 3-glycidoxybutyltrimethoxysilane, and other derivatives with different substitutions.

Examples of methacryloxy silanes include but are not limited to 2-methacryloxypropyltrimethoxysilane, 2-methacryloxypropyltriethoxysilane, 2-methacryloxypropylmethyldimethoxysilane, 3-acryloxypropyltrimethoxysilane, 3-acryloxypropyltriethoxysilane and other derivatives.

An anti-reflective coating may be included on a substrate, either on the same surface as the conductive layer or on a different surface, as desired. An anti-reflective coating acts to reduce the reflection at the surface, allowing a higher level of visible light transmission. Typically, anti-reflective coatings include several different sub-layers comprising many different materials such as, but not limited to, aluminum oxide, zirconium oxide, magnesium fluoride, silicon dioxide, cryolite, lithium fluoride, thorium tetrafluoride, cerium fluoride, lead fluoride, zinc sulfide, zinc scandium sulfide, silicon, tellerium, magnesium oxide, yttrium oxide, scandium oxide, silicon oxide, hafnium oxide, zirconium dioxide, cerium oxide, niobium oxide, tantalum oxide, and titanium oxide.

The thickness of each sublayer is often related to an even whole number division of the wavelength of light that is most preferred to be transmitted through the coated material. Typical sublayer thicknesses required to achieve a particular visible light transmission level are also known in the art.

In one embodiment, an anti-reflecting coating may be applied by vacuum deposition according to one of the following techniques: by evaporation, optionally ion beam-assisted; by spraying using an ion beam; by cathode sputtering; or by plasma-assisted vapor-phase chemical deposition.

Following formation, the conductive layer may be placed in electrical communication with a power source that may apply a voltage across the film and instigate a current flow. The current flow may heat the film and the surrounding area, causing a temperature increase at the surface and thereby preventing water vapor condensation as droplets on the surface.

In one preferred embodiment, a coated transparent substrate may be a component of a pair of goggles. In this regard, one embodiment of a pair of goggles that may contain the coated transparent substrate will now be described in more detail. Referring to FIG. 1, a pair of goggles 100 is shown including a frame 102 and a transparent lens 103. Side bows 106, 107 are attached to the opposite sides of the frame 102 for securing the goggles during use. Though illustrated as side bows, the goggles may alternatively incorporate straps, bands, or any other device for securing the goggles 100 to the wearer's head. The frame 102 may include a shaped portion 110 on the top and bottom (not shown) that may fit snugly against the forehead and face of a wearer to further protect the eyes of the wearer.

The lens 103 may be formed of a transparent substrate, such as a glass or a polycarbonate and may extend across the majority of the wearer's field of vision. In another embodiment, a pair of goggles may be formed with two separate lenses that may function only for protective purposes or may also be corrective lenses.

The cured film is formed on a surface of the lens 103 and placed in electrical communication with a power supply 110, such as a battery. Any battery as is known in the art can be utilized including either rechargeable batteries or disposable batteries. For instance, a lithium ion battery 110 may be in electrical communication with a first electrode 111 by means of a first lead 112, for example a cathode lead at 7.5 volts. The first electrode 111 may also be in electrical communication with the conductive layer. In addition, a second lead 114, for example, an anode lead, may be in electrical communication with a second electrode 115 that is on the opposite side of the lens 103. The battery 110 may be a component of a power pack 118. The power pack 118 may also include a switch 116 that may be in electrical communication with the other electrical components of the system. The power pack may include one or more loops 120 that may be used to connect the power pack to a convenient location such as the wearer's belt, jacket, or so forth. The loops 120 may be replaced with any suitable connecting device such as hooks, clips, bands, etc.

In one embodiment, the battery may be within or on the goggles. For example, a battery may be attachable to the frame of the goggles, for instance in a battery casing that is accessible for battery replacement. In this embodiment, a switch may also be included on the frame for completion of a circuit.

Upon closing the switch 116, a circuit may be completed that passes through the conductive layer of the goggles 100. Current flow through the coating layer may increase the temperature of the layer by an amount that is sufficient to prevent condensation forming on the lens 103 while not being uncomfortably warm for a wearer. For instance, upon completion of the circuit, the temperature of the surface of lens 103 may increase by less than about 5° C., or less than about 4° C. in another embodiment. In one embodiment, the temperature of the surface of the lens 103 may increase between about 2° C. and about 5° C.

In another embodiment, an active conductive layer may be formed on a facemask. For example, a facemask may include a visor attached to a filter body. The coating may be formed on the visor and placed in electrical communication with a power source, such as a power pack illustrated in FIG. 1. The visor is formed from a transparent substrate and is dimensioned to fit across the width of the filter body and extend over the eyes of the wearer. In one particular embodiment, the visor may be formed from polyethylene terephthalate. A facemask also includes a filter body attached to the visor. The filter body is designed to retard the flow of liquids to the nose and mouth of the wearer. The filter body may be formed in any manner known to those skilled in the art. As will be appreciated by those skilled in the art, the filter body may be constructed from any of a variety of different materials and contain any number of desired layers.

Although various configurations have been described above, it should be understood that the present disclosure is not limited to any particular substrate. For example, in one embodiment, a transparent conductive film may be formed on an optical device such as goggles, glasses, facemasks, etc., and in another embodiment, a transparent conductive film may be formed on a substrate for a different application, for instance in forming a window, a viewscreen, and so forth.

The present disclosure may be further understood with reference to the Examples provided below.

Example 1

1) Semiconductive Solution Preparation

PSS/PEDOT semiconductive solution was prepared by mixing PSS and PEDOT solids (raw materials are commercially available from Aldrich) with deionized water in an amount of 1.5-3.0% by weight of the solution at 55° C. for 6 hours. Following, the suspension was sonicated for 3 hours to insure a homogeneous mixture. During the reaction, the pH value (pH=1-4) was adjusted by use of 2M $H_2SO_4$.

2) Metallo-Solvent Preparation

Metal salts such as $Ni(NO_3)_2$, $CuSO_4$, and $AgNO_3$ were dissolved in deionized water individually to effect a metal ion concentration range from $10^{-1}$-$10^{-3}$ M. The prepared metal solutions were added to 0.5% wt of DMSO to prevent electrochemical reduction.

3) Carbon Nanotube Precursor Solution

Oxidation of Carbon Nanotubes: 0.5-2.5 wt % of single wall carbon nanotubes were first sonicated in mixed nitric acid/sulfuric acid (1/4 ratio in volume) for 4 hours. Upon cooling, the solution was diluted with D. I. Water. The oxidized CNT were collected by filtration and washed with water until the filtrate measured pH=7. The black CNT were dispersed again in water and sonicated with mixed $H_2SO_4$ and $H_2O_2$ for 4 hours; the final product was filtered and washed with water, then dried under vacuum at room temperature.

Thiothene functionalized CNT: Under $N_2$ atmosphere, 5-10 wt % of oxidized CNT (compared to the amount of 2-aminothiophene) were stirred at room temperature with 10-20 wt % of DCC (dicyclohexylcarbodiimide) and dry DMF for 8 hours, and then the sealed flask was sonicated for 1 hour at room temperature. 2-aminothiophene was dissolved in dry DMF and added to above solution at room temperature, the mixture was then agitated for 4 hours at 80° C. with inert $N_2$. The product was collected through filtration and washed with methanol, acetone, DMF, and water, respectively, and dried under vacuum for 8 hours at 60° C.

0.5-3.0 wt % of the thiophene functionalized carbon nanotubes were sonicated for 30 minutes with DMF/$H_2O$, and then the solution was stirred at 90° C. for 8 hours until a homogeneous solution was formed.

The solution was used for blending quickly. If stored for 24 hours or more, a precipitate may form, requiring the solution to be sonicated again for 30 min before incorporating it into a formulation.

4) Synthesis of Semiconductive Coating Solution

In a round bottom flask, 95-99 wt. % of the PSS/PEDOT solution (prepared in step 1) was added to 1-5 wt. % of the CNT solution (prepared in step 3), and then the mixture was sonicated for 1 hour and stirred at room temperature for 4 more hours. The solution was used immediately.

The PSS/PEDOT/CNT solution was added drop-wise to 1-10 wt. % of a solution of metal ions (prepared in step 2) under constant agitation at room temperature and stirred for 3 hours to ensure complete blending. Then, the solution was sonicated for 1.5 hours.

5) Preparation of Siloxane Hard Coat

A coating solution was prepared by mixing 208 g of tetraethyl orthosilicate, 90 g of glycidoxypropyltrimethoxy silane, 10 g of methacryloxypropyltrimethoxy silane, 238 g of isopropyl alcohol, 46 g of water, 0.8 g of 2M HCl and 6.4 g of 2M acetic acid in a flask. The solution was mixed at room temperature to partially hydrolyze the silanes and to achieve a clear solution. The solution was then heated at 70° C. for 1-2 hours while stirring to completely hydrolyze the silanes. Following, the solution was cooled to room temperature followed by addition of 3.2 g of surfactant (Brij® 98, available from Sigma-Aldrich, Inc.), and 2.4 g of aluminum acetylacetonate. The solution was stirred for more time to dissolve the solids and to achieve a homogeneous and clear siloxane hard coat solution.

6) Composition and Preparation of Final Conductive Coating 90-95 wt % of the PSS/PEDOT/CNT/Metal solution was mixed with 5-10 wt % of the siloxane hard coat mixture under a mechanical stirrer for 2 hours at room temperature to give a homogeneous final conductive coating solution.

7) Coating Procedure of Conductive Coating on Plastic Lenses

Clean lenses were dipped into the conductive solution and pulled out at a speed of 1-2 inches per minute. Lenses were dried in air for few minutes and then cured in a heating oven at 100-120° C. for 1-2 hours. Lenses were taken out of the oven and cooled at room temperature. The conductive film coated on the surface of the lens had a film thickness ranging from 0.8-1.2 micron thick.

8) Conductivity Measurement Data

Film resistance was measured by a standard SYS-301 four point probe system (available from Signatone Corporation) at room temperature.

Film sheet resistance was in the range of 330-890 $\Omega$/square, film conductivity was in the range of 185-485 S/cm.

10) Surface Temperature Measurements Data with Voltage Applied to Film

Surface temperature increasing was measured with an electric circuit of semiconductive coated polycarbonate substrate with a cathode and anode attachment and a pair of lithium ion batteries. The applied voltage was in the range of 3.5-12.0 volts, and the current was in the range of 0.3-2.0 amperes. The increase in surface temperature was directly proportional to the applied voltage.

Figure 2:
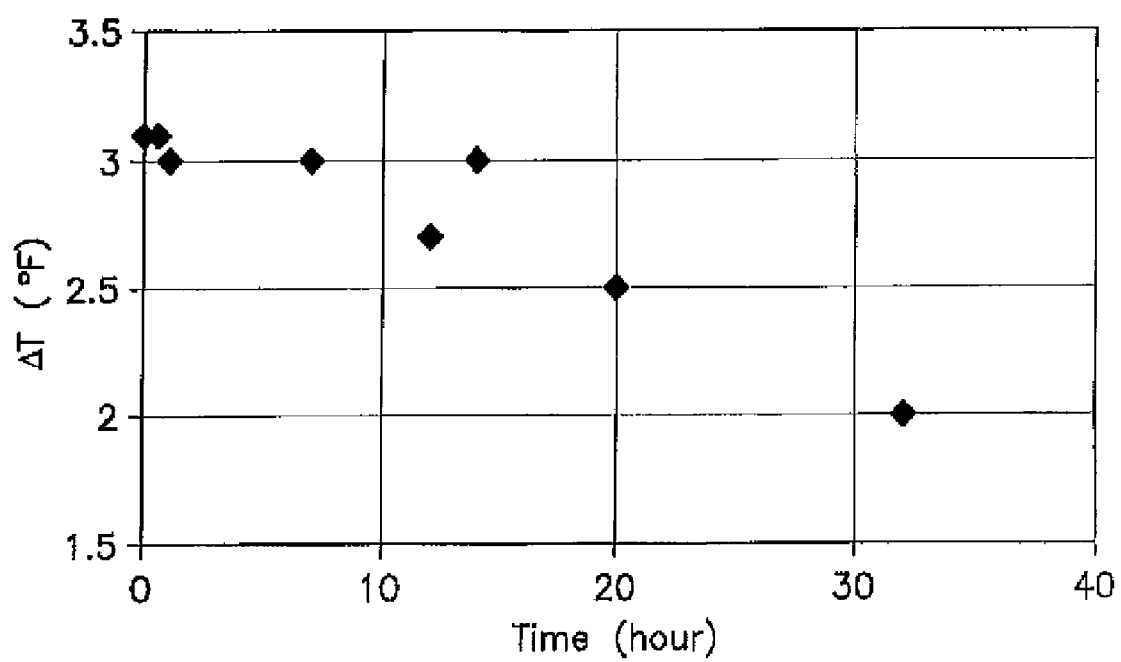
FIG. 2 graphically illustrates the temperature increase of a polycarbonate surface by use of a coating composition as described herein.

Results are shown in FIG. 2. As can be seen, the measured surface temperature increase was in a range of 0.5-7.5° C.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:
1. An optical device comprising:
   a transparent lens;
   a conductive transparent layer on a surface of the transparent lens, the conductive transparent layer comprising a crosslinked network including a polythiophene, thiophene functionalized carbon based nanostructures, and a transition metal crosslinking agent; and
   a power source in electrical communication with the conductive transparent layer.

2. The optical device according to claim 1, wherein the polythiophene is poly(3,4-ethylene-dioxythiophene).

3. The optical device according to claim 1, further comprising polystyrene sulfonic acid.

4. The optical device according to claim 1, wherein the carbon based nanostructures are carbon nanotubes.

5. The optical device according to claim 1, wherein the transition metal is selected from the group consisting of manganese, iron, cobalt, nickel, copper, silver, gold, platinum, palladium, and chromium.

6. The optical device according to claim 1, wherein the transition metal crosslinking agent is a transition metal salt.

7. The optical device according to claim 6, wherein the transition metal salt is a halide, chloride, sulfate, acetate, ammonium, or nitrate salt.

8. The optical device according to claim 1, the conductive transparent layer further comprising a fluoropolymer or a siloxane polymer.

9. The optical device according to claim 1, wherein the optical device is a pair of goggles or a pair of glasses.

10. The optical device according to claim 1, wherein the transparent lens is a glass lens or a polymeric lens.

11. The optical device according to claim 1, wherein the transparent lens is a corrective lens.

12. The optical device according to claim 1, wherein the power source is a battery.

13. The optical device according to claim 12, further comprising a cathode lead between the battery and the film and an anode lead between the battery and the conductive transparent layer.

14. The optical device according to claim 1, further comprising a switch, the switch being capable of completing a circuit comprising the power source and the conductive transparent layer.

15. The optical device according to claim 1, the lens comprising one or more additional layers.

16. A substrate defining a first surface and comprising a conductive transparent layer on the first surface, the conductive transparent layer comprising a crosslinked network including poly(3,4-ethylene-dioxythiophene), polystyrene sulfonic acid, thiophene derivatized carbon nanotubes, and a transition metal crosslinking agent.

17. The substrate according to claim 16, wherein the substrate is transparent.

18. The substrate according to claim 16, wherein the conductive transparent layer is in electrical communication with a power source.

* * * * *